(12) United States Patent
Akiyama et al.

(10) Patent No.: US 6,764,099 B2
(45) Date of Patent: Jul. 20, 2004

(54) SHOCK ABSORBING STRUCTURE FOR VEHICLES

(75) Inventors: Hideki Akiyama, Saitama (JP); Toyokazu Nakamura, Saitama (JP); Takeyasu Itabashi, Saitama (JP); Satoshi Iijima, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 56 days.

(21) Appl. No.: 10/091,560

(22) Filed: Mar. 7, 2002

(65) Prior Publication Data

US 2002/0125710 A1 Sep. 12, 2002

(30) Foreign Application Priority Data

Mar. 7, 2001 (JP) ........................................ 2001-063222
Mar. 7, 2001 (JP) ........................................ 2001-063978

(51) Int. Cl.⁷ .......................... B60R 19/22; B60R 21/02; B62D 21/15
(52) U.S. Cl. ........................ 280/784; 280/748; 293/109; 293/133
(58) Field of Search ................................. 180/274, 311; 280/770, 784, 748; 293/104, 105, 120, 126, 132, 146, 154, 109, 110, 133; 188/377

(56) References Cited

U.S. PATENT DOCUMENTS

| | | | | |
|---|---|---|---|---|
| 2,517,860 A | * | 8/1950 | Forgy | 244/1 R |
| 2,929,637 A | * | 3/1960 | Papacosta | 280/29 |
| 3,226,146 A | * | 12/1965 | Behr | 293/30 |
| 3,785,688 A | * | 1/1974 | Sibley | 293/124 |
| 3,831,997 A | * | 8/1974 | Myers | 296/189 |
| 3,893,726 A | * | 7/1975 | Strohschein | 293/1 |
| 3,909,058 A | * | 9/1975 | Kramer et al. | 296/189 |
| 3,917,332 A | * | 11/1975 | Puleo | 293/109 |
| 4,109,951 A | * | 8/1978 | Weller | 293/108 |

(List continued on next page.)

FOREIGN PATENT DOCUMENTS

| | | | |
|---|---|---|---|
| AT | 150676 | 9/1937 | |
| CH | 652359 A5 | 11/1985 | |
| DE | 854157 | 10/1952 | |
| DE | 3431406 A1 | 3/1986 | |
| DE | 4222253 A1 * | 1/1994 | ........... B60R/21/02 |
| DE | 4406129 A1 | 5/1995 | |
| DE | 4344568 A1 | 6/1995 | |
| DE | 19629879 A1 | 1/1998 | |
| EP | 1046546 A1 | 10/2000 | |
| FR | 2639297 A1 * | 5/1990 | ........... B60R/19/42 |
| FR | 2654689 A1 * | 5/1991 | ........... B60R/19/22 |
| GB | 2328654 A | 3/1999 | |
| JP | 10-67374 A | 3/1998 | |

*Primary Examiner*—Laura B. Rosenberg
(74) *Attorney, Agent, or Firm*—Birch, Stewart, Kolasch & Birch, LLP (57) ABSTRACT

In order to have an external force heading from the front toward the occupant received, a bumper member extending substantially along the length of the vehicle is disposed under or by the sides of the cabin (riding space). The shock absorbing members are connected at the rear ends of the bumper member. Even in the case of the vehicle in which it is difficult to dispose the shock absorbing member at the front portion of the vehicle within the range of the length of the vehicle for example, when an impact load is exerted to such a vehicle, the impact load may be efficiently absorbed. As a consequent the riding space for an occupant can be maintained. The shock absorbing body may be constructed of an upper shock absorbing member and a lower shock absorbing member. The upper and lower shock absorbing members may be formed of two types of members having different crushing features. Accordingly, since the shock absorbing body is constructed by combining two members having different crushing features, the crushing extent of the shock absorbing body may preferably be determined corresponding to the two-wheel vehicle.

16 Claims, 9 Drawing Sheets

U.S. PATENT DOCUMENTS

| | | | | |
|---|---|---|---|---|
| 4,182,529 A | * | 1/1980 | Taylor | 293/132 |
| 4,352,514 A | * | 10/1982 | Orima | 293/110 |
| 4,586,739 A | * | 5/1986 | Loren et al. | 293/120 |
| 4,671,550 A | * | 6/1987 | Molnar | 293/120 |
| 5,213,383 A | * | 5/1993 | Muselli et al. | 293/2 |
| 5,451,077 A | * | 9/1995 | Fantauzzo | 280/784 |
| 5,799,991 A | * | 9/1998 | Glance | 293/121 |
| 5,810,427 A | * | 9/1998 | Hartmann et al. | 296/189 |
| 6,142,542 A | * | 11/2000 | Sherno | 293/132 |
| 6,158,356 A | * | 12/2000 | Hachet et al. | 105/392.5 |
| 6,308,999 B1 | * | 10/2001 | Tan et al. | 293/109 |
| 6,428,065 B2 | * | 8/2002 | Sato et al. | 293/121 |
| 6,435,577 B1 | * | 8/2002 | Renault | 293/120 |
| 6,540,275 B1 | * | 4/2003 | Iwamoto et al. | 293/24 |
| 2003/0034658 A1 | * | 2/2003 | Cate et al. | 293/109 |

* cited by examiner

SHOCK ABSORBING STRUCTURE FOR VEHICLES

CROSS-REFERENCE TO RELATED APPLICATIONS

The present application claims priority under 35 USC 119 to Japanese Patent Application Nos. 2001-063222 filed on Mar. 7, 2001 and 2001-063978 filed on Mar. 7, 2001 the entire contents thereof are hereby incorporated by reference.

FIELD OF THE INVENTION

The present invention relates to a shock absorbing structure for vehicles having a riding space for an occupant. The shock absorbing member projects from the vehicle body and is capable of absorbing an impact by crushing the shock absorbing member.

DESCRIPTION OF BACKGROUND ART

A shock absorbing structure for a vehicle is described in "Vehicle Frame Having a Footboard Portion" which is disclosed in Japanese Patent Laid-Open No. 67374/1998.

The aforementioned technology comprises a deforming element disposed above a front wheel and forwardly of the main frame pipe, so that when the impact load is exerted from the front of the vehicle, the impact load is received at the deforming element to reduce the impact.

However, since the vehicle frame is provided with the aforementioned footboard portion comprises the deforming element (hereinafter referred to as "shock absorbing member") is disposed above the front wheel and forwardly of the main frame pipe, there may be the case where it is difficult to provide a shock absorbing member having a sufficient size for absorbing the impact load. Especially, since the general two-wheel vehicle or the cab-over-engine trucks in which the entire or almost all of the portion of the motor is located under the driver's compartment have a construction without a front nose, it is difficult to dispose the shock absorbing member at the front portion of the vehicle within the region of the vehicle length.

Even in vehicles wherein the disposition of the shock absorbing member at a front portion of the vehicle within the region of the length of the vehicle is difficult, in the case where an impact force is exerted for example, it is still desirable to have the impact load efficiently absorbed.

Figure 10A:
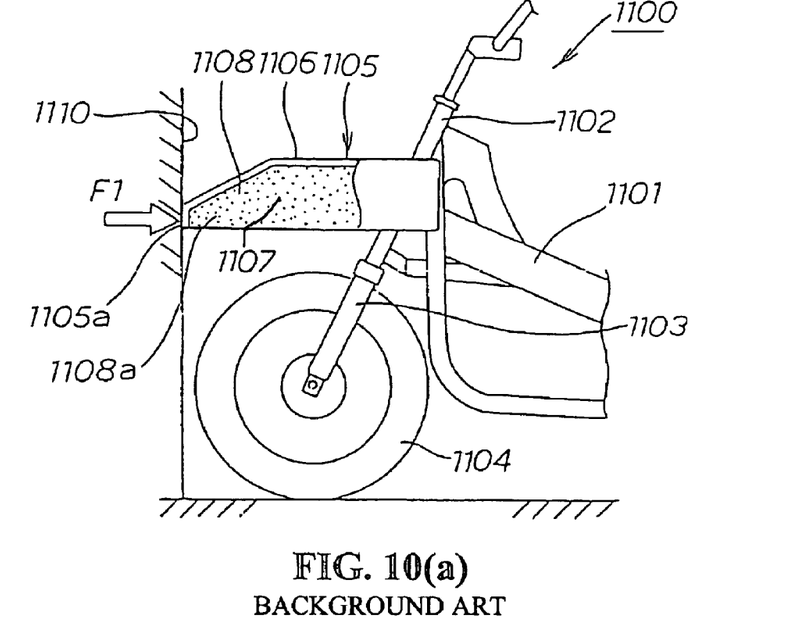
FIGS. 10(a) and 10(b) are explanatory drawings illustrating the action of the shock absorbing structure for motorcycles in the related art.
Figure 10B:
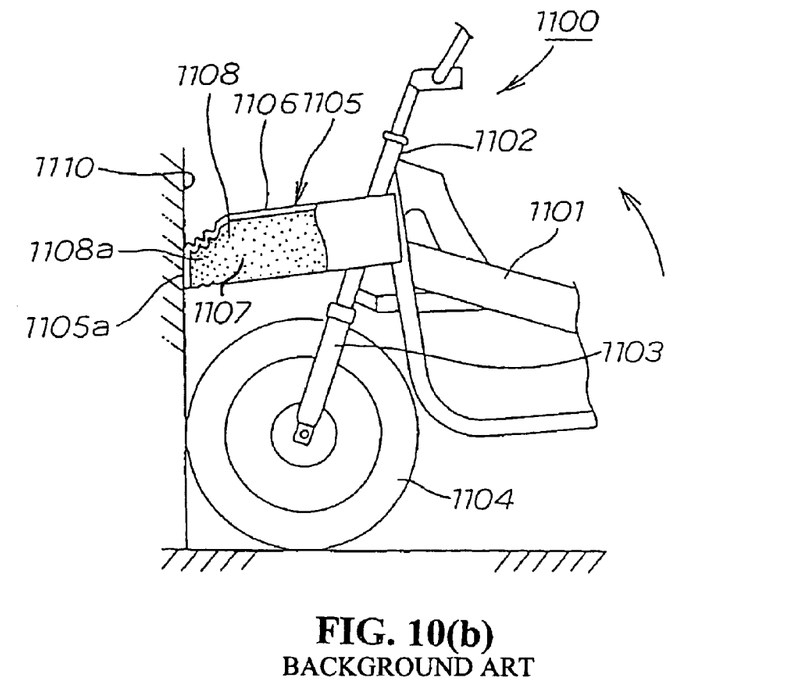

FIGS. 10(a) and 10(b) are explanatory drawings illustrating the action of a shock absorbing structure for motorcycles according to background art. As shown in FIG. 10(a), a fork 1103 is attached on the head pipe 1102 provided on the body frame 1101 of the motorcycle 1100. A front wheel 1104 is mounted on the fork 1103. A deforming element (hereinafter, referred to as "shock absorbing member") 1105 is mounted on the front end of the vehicle frame 1101 so that the sock absorbing member 1105 is disposed above the front wheel 1104.

The shock absorbing member 1105 comprises a foamed material 1108 in the hollow portion 1107 of the frame body 1106.

In FIG. 10(a), when the motorcycle 1100 comes into a collision with an obstruction 1110, the front end portion 1105a of the shock absorbing member 1105 comes into collision with the obstruction 1110, and the impact force F1 due to collision acts on the front end portion 1108a of the foamed material 1108 as shown by the arrow.

In FIG. 10(b), the impact force acts on the front end portion 1108a of the foamed material 1108 to crush the front end portion 1108a of the foamed material 1108. In this way, the impact force F1 is reduced by having the front end portion 1108a of the foamed material 1108 crushed, so that the resultant reduced impact force is transmitted to the frame.

In order to reduce the impact force F1 when the motorcycle 1100 comes into a collision with an obstruction 1110, it is necessary to determine the crush amount of the shock absorbing member 1105 to be a large value to some extent.

However, if the crush amount of the shock absorbing member 1105 is too large, the motorcycle 1100 may move as shown by the arrow and the rear portion of the vehicle body may bounce upwardly into the air, which may result in pitching (that is a lurching forward or backward of the vehicle body).

Therefore, in order to obtain two effects such as preferably reducing the impact force F1 and preventing the occurrence of pitching, it is necessary to strictly determine the crush amount of the shock absorbing member 1105. Therefore, it is desirable to commercialize a shock absorbing member 1105 in which the crush amount of the shock absorbing member 1105 can easily be adjusted.

SUMMARY AND OBJECTS OF THE INVENTION

Accordingly, an object of the present invention is to provide a technology to efficiently absorb an impact load, when it is exerted on a vehicle, and to minimize the damage to the riding space of the occupant.

In order to achieve the object described above, in an a vehicle having a riding space for an occupant, the shock absorbing structure for the vehicle according to the present invention comprises a bumper member extending substantially along the length of the vehicle under or by the sides of the riding space for receiving an external force heading from the front to the occupant, and a shock absorbing member connected at the rear ends of the bumper member.

The bumper member extends along the length of the vehicle for receiving an external force heading towards the occupant and the shock absorbing member is connected at the rear ends of the bumper member to absorb the impact load.

In other words, by providing the bumper member extending along the length of the vehicle under or by the sides of the riding space and connecting the shock absorbing member for absorbing the impact load at the rear end of the bumper member, when an impact load is exerted thereon, the impact load can be efficiently absorbed even in the vehicles in which arrangement of the shock absorbing member at the front portion thereof is difficult within the range of the length of the vehicle.

The shock absorbing structure for vehicles according to the present invention is characterized in that when the crushing amount of the shock absorbing member is referred to as the effective crushing length of the shock absorbing member, the effective crushing length is the length from the front end of the vehicle body to the front end of the riding space.

The total amount of movement of the bumper member for maintaining the riding space is preferably the length from the front end of the vehicle body to the front end of the riding space. Therefore, by determining the effective crushing length of the shock absorbing member to be the length from the front end of the vehicle to the front end of the riding space, the total amount of movement allowed for maintaining the riding space is given to the bumper member.

Accordingly, it is an object of the present invention to provide a shock absorbing structure for two-wheel vehicle in which the crush amount of the shock absorbing structure can easily be determined so as to satisfy two requirements for significantly reducing the impact force and preventing occurrence of pitching.

In order to achieve the aforementioned object, the present invention provides a shock absorbing structure for two-wheel vehicle for absorbing the impact by having a shock absorbing body projecting from the vehicle body that is crushed. The shock absorbing body comprises an upper shock absorbing member disposed on the upper side, and a lower shock absorbing member disposed below the upper shock absorbing member. The upper and lower shock absorbing members are formed of two types of members having different crushing features.

The shock absorbing body is constructed of the upper shock absorbing member and the lower shock absorbing member. The upper and lower shock absorbing members are constructed of two types of members having different crushing features. Since the shock absorbing body is formed by combining two types of members having different crushing features as described above, the crushing extent of the shock absorbing body can desirably be determined corresponding to the two-wheel vehicle.

According to the present invention, the lower shock absorbing member is characterized by being easily deformable by a low-load in comparison with the upper shock absorbing member.

By making the lower shock absorbing member easily deformable with a low-load, the impact can be sufficiently absorbed. In addition, since the upper shock absorbing member can prevent the shock absorbing body from being crushed too much, the rear portion of the vehicle body of the two-vehicle is prevented from bouncing upwardly into the air upon collision.

According to the present invention a structure is provided wherein the two members are constructed of foamed resin of the same material but different in crushing feature due to the difference in density.

By forming the two members of foamed resin of the same material in different densities, the crushing features of two members may be differentiated. The crushing features of the two members can be differentiated relatively easily because it is achieved only by making the density of the foamed resin different.

In addition, foamed resin is a material that is available relatively easily, and the cost thereof is relatively low. Therefore, the cost of the upper and lower shock absorbing members can be reduced.

Furthermore, since foamed resin is a material that can be processed relatively easily, it can be formed into a desired shape relatively easily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
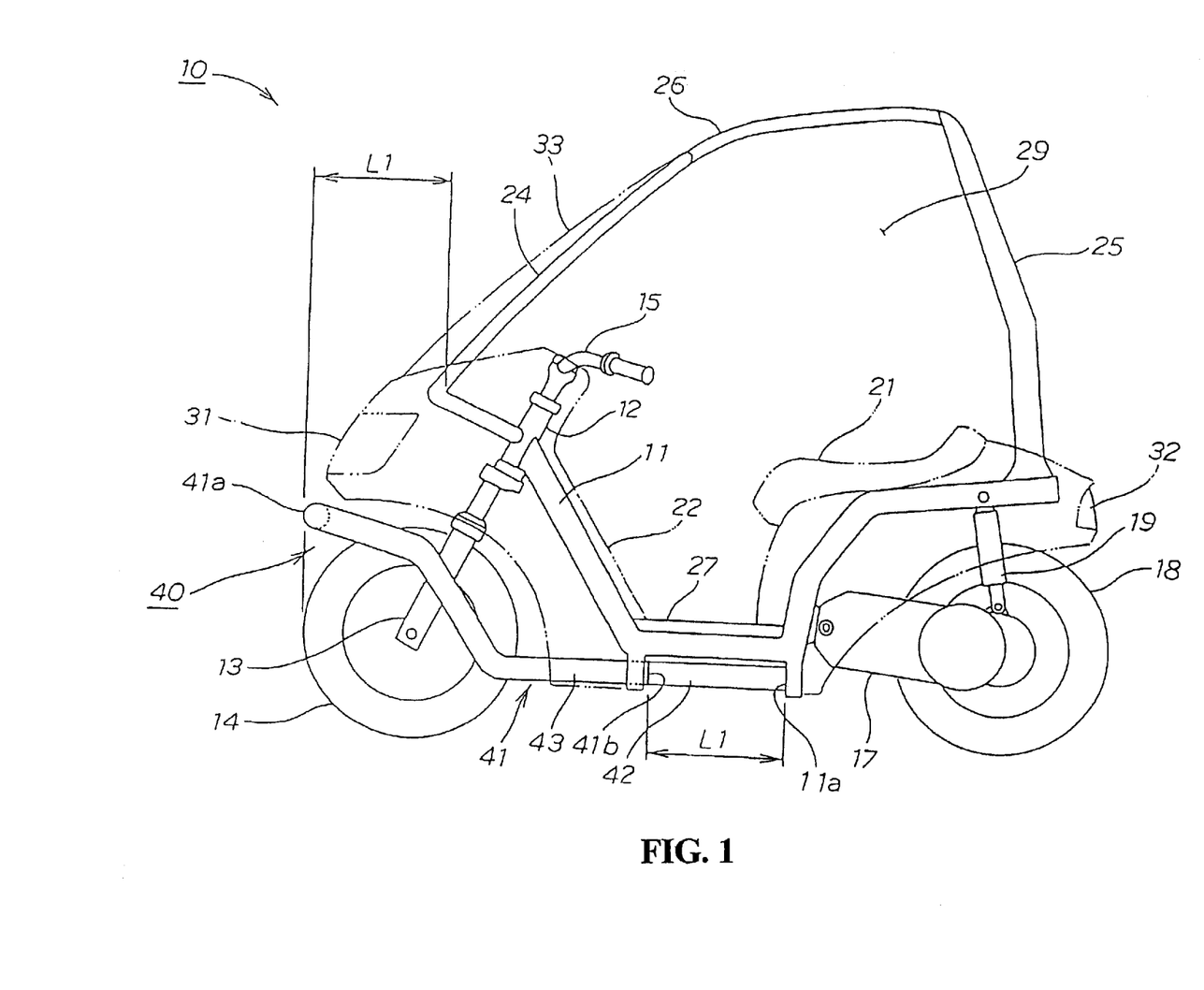
FIG. 1 is a side view of the vehicle having a shock absorbing structure according to the present invention mounted thereon.

Referring now to the drawings, embodiments of the present invention will be described. FIG. 1 is a side view of the vehicle having a shock absorbing structure according to the present invention mounted thereon.

The two-wheel vehicle includes a cabin 10 with a vehicle body frame 11, a head pipe 12 mounted at the front portion of the vehicle body frame 11, a front fork 13 mounted on the head pipe 12 and a front wheel 14 mounted on the front fork 13. A handle 15 is connected to the front fork 13. A power unit (not shown) is disposed under the vehicle body frame 11 at the center thereof. A swing unit 17 is mounted on the rear portion of the vehicle frame 11. A rear wheel 18 is mounted on the rear portion of the swing unit 17 with a suspension 19 laid between the rear portion of the vehicle body frame 11 and the swing unit 17. An occupant's seat 21 is disposed substantially at the center of the vehicle body frame 11. A body cover 22 is provided for covering the vehicle body frame 11. Front members 24, 24 (the front member 24 located behind is not shown) extend from the left and right of the head pipe 12 with supporting members 25, 25 (the supporting member 25 located behind is not shown) extending from the left and right of the rear portion of the vehicle body frame 11. A roof 26 is supported by the front members 24, 24 and the supporting members 25, 25. A floor 27 is formed at the lower portion of the center of the vehicle body frame 11. A cabin 29 is provided as a riding space for an occupant defined mainly by the floor 27, the roof 26, the supporting members 25, 25 and the front members 24, 24.

In FIG. 1, a headlight 31, a tail lamp 32 and a windscreen 33 are mounted on the vehicle body frame.

The two-wheel vehicle with a cabin 10 is a vehicle provided with a shock absorbing structure 40 for vehicles comprising a bumper member 41 that is slidably mounted on the vehicle body frame 11 and includes a front end 41a formed in a U-shape. Shock absorbing members 42, 42 (the shock absorbing member 42 located behind is not shown) are provided for absorbing an impact load by being laid between the ends 41b, 41b (the end 41b located behind is not shown) of the bumper member 41. Receiving portions 11a, 11a (the receiving portion 11a located behind is not shown) are provided to the rear of the vehicle body frame 11. All of the above are referred to as a "shock absorbing structure" 40.

The bumper member 41 is a member shaped like a letter U in plan view as described above, and bent stepwise in side view, so that the shock absorbing members 42, 42 are disposed at the rear ends 41b, 41b of the bumper member 41 and the straight portions 43, 43 thereof are positioned below the vehicle-body frame 11.

The shock absorbing member 42 is a member for absorbing an impact load, and when taking the length of the shock absorbing member for L1, the length L1 is determined to be the length from the front end of the two-wheel vehicle with a cabin 10 (vehicle body) to the front end of the cabin 29 (riding space).

The total amount of movement of the bumper member 41 for maintaining the cabin 29 (riding space) is preferably the length from the front end of the two-wheel vehicle with a cabin 10 (vehicle body) to the front end of the cabin 29. Accordingly, the length of the shock absorbing member 42 is determined to be the length from the front end of the two-wheel vehicle with a cabin 10 to the front end of the cabin 29, so that the total amount of movement allowed for maintaining the cabin 29 is given to the bumper member 41.

As a consequent, when an impact load is exerted on the two-wheel vehicle with a cabin 10, the impact load is efficiently absorbed.

In other words, in a vehicle having a riding space for an occupant, the shock absorbing structure 40 is constructed in such a manner that a bumper member 41 extends substantially along the length of the vehicle for receiving an external force heading from the front toward an occupant that is mounted under or by the sides of the cabin 29 (riding space), and the shock absorbing members 42, 42 are connected at the rear end of the bumper member 41.

The bumper member 41 extending along the length of the vehicle receives an external force heading toward the occupant, and the shock absorbing members 42, 42 connected at the rear ends of the bumper member 41 absorb the impact load.

In other words, the two-wheel vehicle with a cabin 10 includes the bumper member 41 extending along the length of the vehicle under or by the sides of the cabin 29, and the shock absorbing members 42, 42 connected at the rear ends of the bumper member 41. Therefore, even in the case of the vehicle in which it is difficult to dispose of the shock absorbing member at the front portion of the vehicle within the region of the length of the vehicle for example, when an impact load is exerted to such a vehicle, the impact load is efficiently absorbed. Consequently, the impact load is absorbed and thus deformation of the cabin 29 (riding space) can be minimized.

The action of the shock absorbing structure 40 described thus far will now be illustrated.

Figure 2A:
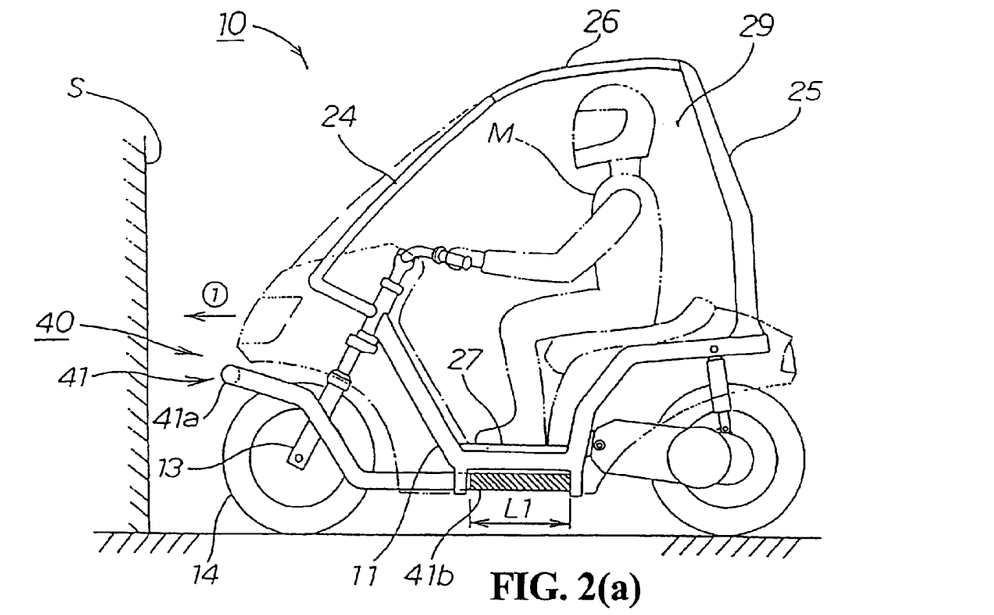
FIGS. 2(a) and 2(b) are explanatory drawings showing the action of the vehicle having the shock absorbing structure according to the present invention mounted thereon.
Figure 2B:
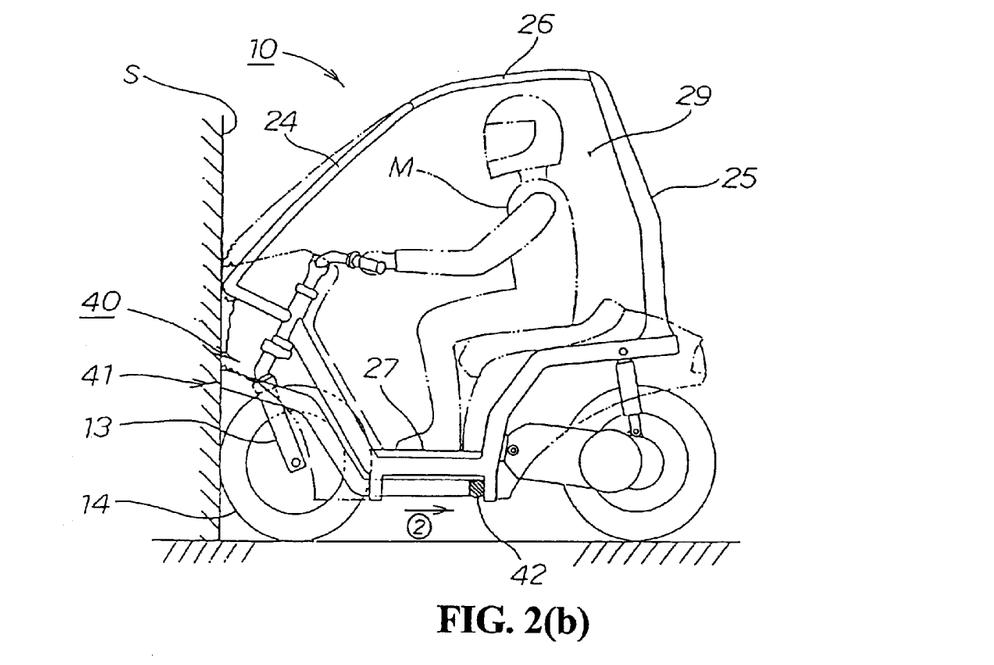

FIGS. 2(a) and 2(b) are explanatory drawings showing the action of the vehicle having a shock absorbing member according to the present invention mounted thereon.

In FIG. 2(a), for example, the two-wheel vehicle with a cabin 10 is moving in a forward direction as shown by the arrow (1).

In FIG. 2(b), when the two-wheel vehicle with a cabin 10 reaches an obstruction S such as a wall, the front fork 13 and the front wheel 14 are deformed and the bumper member 14 moves as shown by the arrow (2) to crush the shock absorbing member 42. By having the shock absorbing member 42 crushed, the impact load exerted on the two-wheel vehicle with a cabin 10 is absorbed.

As a consequence, deformation of the cabin 29 defined mainly by the floor 27, the roof 26, the supporting members 25, 25, the front members 24, 24 is prevented and thus the riding space of the occupant M may be maintained.

In the shock absorbing structure 40, when the crushing amount of the shock absorbing member 42 is referred to as the effective crushing length L1 of the shock absorbing member, it is preferable that the effective crushing length L1 is the length from the front end of the two-wheel vehicle with a cabin 10 (vehicle body) to the front end of the cabin 29 (riding space).

The total amount of movement of the bumper member for maintaining the riding space is preferably from the front end of the vehicle body to the front end of the riding space. Therefore, by determining the effective crushing length L1 of the impact absorbing member 42 as the length from the front end of the two-wheel vehicle with a cabin 10 (vehicle body) to the front end of the cabin 29 (riding space), the total amount of movement allowed for maintaining the cabin 29 is given to the bumper member 41. As a consequence, when the impact load is exerted on the two-wheel vehicle with a cabin 10, the impact load is efficiently absorbed.

Figure 3:
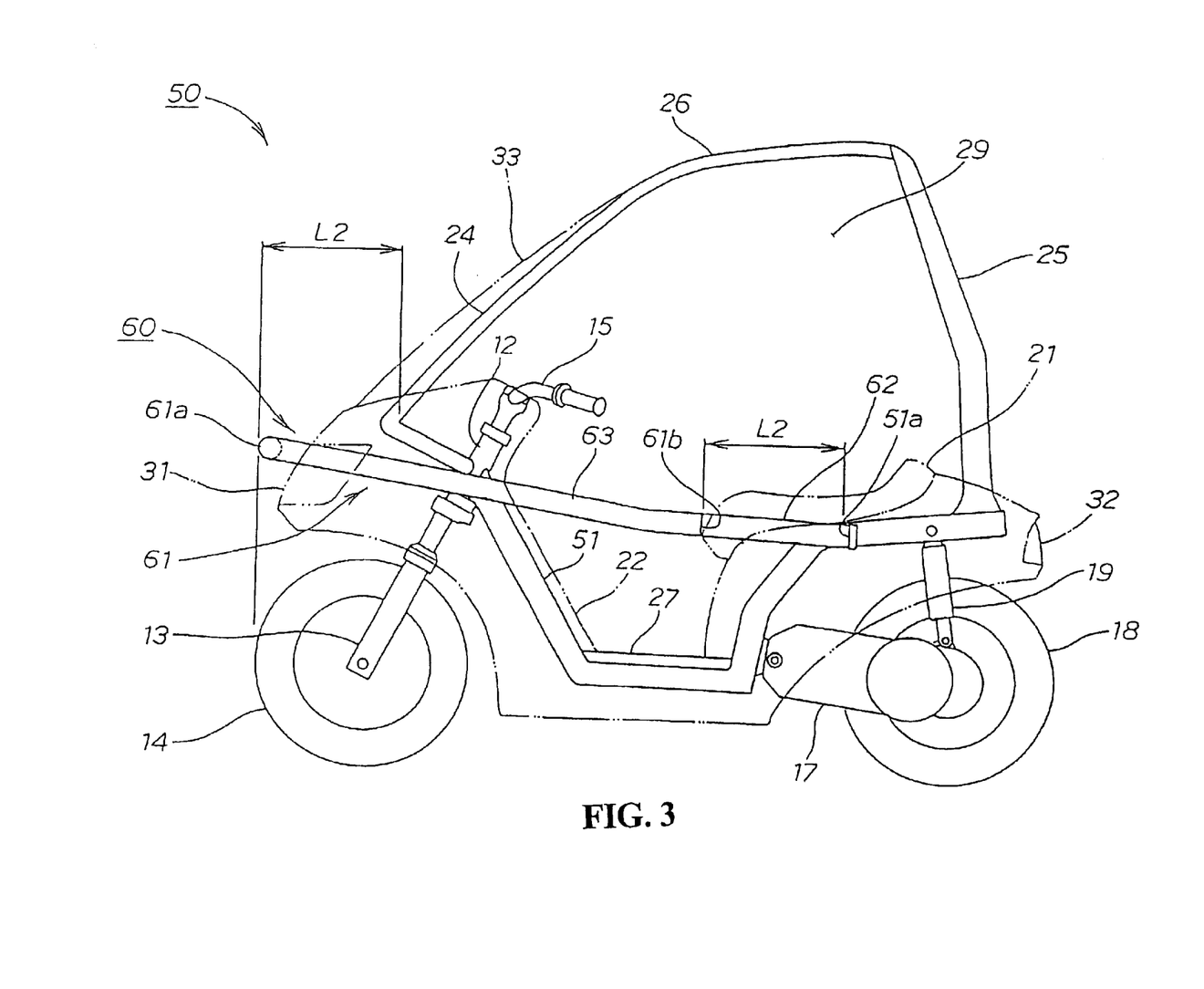
FIG. 3 is a side view of the vehicle having the shock absorbing structure according to a second embodiment of the present invention mounted thereon.

FIG. 3 is a side view of a vehicle having a shock absorbing structure according to the second embodiment of the present invention mounted thereon. The identical components as the two-wheel vehicle with a cabin 10 shown in FIG. 1 are represented by the identical numerals, and are not explained in detail again.

A head pipe 12, a front fork 13, a front wheel 14, a handle 15, a swing unit 17, a rear wheel 18 and a suspension member 19 are operatively connected to each other. An occupant's seat 21, a body cover 22, front members 24, 24 (the front member 24 located behind is not shown), an extended supporting member 25, 25 (the extended supporting member 25 located behind is not shown) are secured to the vehicle frame. A roof 26, a floor 27, a cabin 29 (riding space) form a operator's compartment for the vehicle. A headlight 31, a tail lamp 32 and a windscreen 33 are connected to a vehicle body frame 51. The two-wheel vehicle with a cabin 50 is provided with a shock absorbing structure 60 comprising a bumper member 61 for being slidably mounted on the vehicle body frame 51 and having a front end 61a formed in a U-shape. Shock absorbing members 62, 62 are provided for absorbing an impact load by being laid between the ends 61b, 61b (the end 61b located behind is not shown) of the bumper member 61 and the receiving portions 51a, 51a (the receiving portion 51a located behind is not shown) of the vehicle body frame 61, respectively (hereinafter referred to as "shock absorbing structure 60").

The bumper member 61 is a member shaped like a letter U in plan view and straight in side view. The shock absorbing members 62, 62 are disposed at the rear ends 61b, 61b of the bumper member 61, and the straight portions 63, 63 thereof are positioned by the sides of the vehicle body frame 11.

The shock absorbing member 62 is a member for absorbing an impact load, and is the same member as the impact absorbing member 42 (See FIG. 1) in which the effective crushing length L2 is set to the length from the front end of the two-wheel vehicle with a cabin 50 to the front end of the cabin 29 (riding space), where L2 is the effective crushing length of the shock absorbing member.

The action of the shock absorbing structure 60 as described thus far will now be illustrated.

Figure 4A:
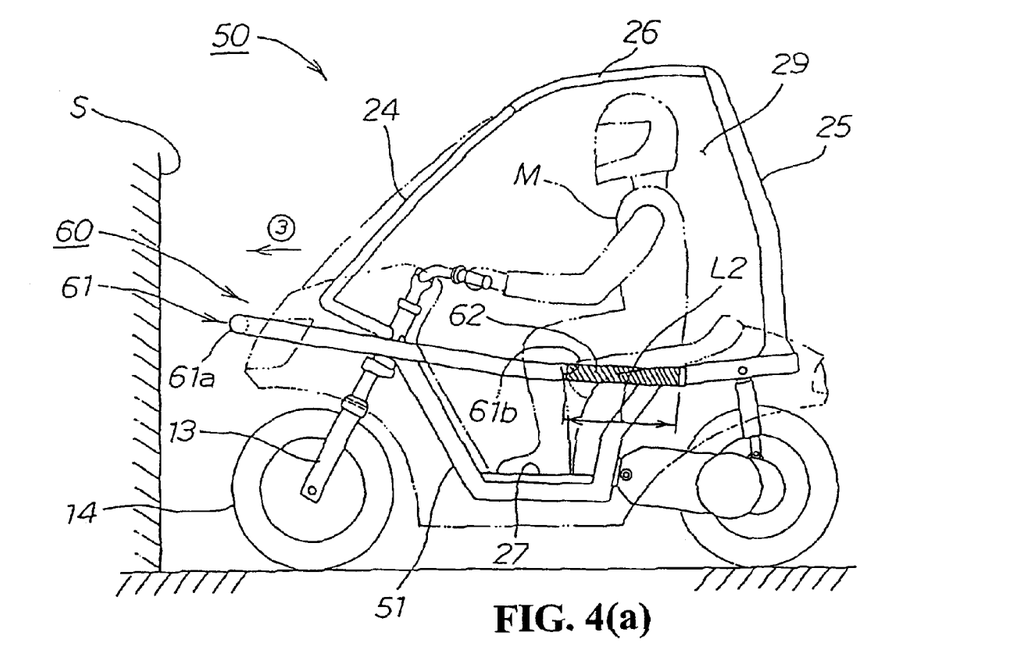
FIGS. 4(a) and 4(b) are explanatory drawings showing the action of the vehicle having the shock absorbing structure according to the second embodiment of the present invention mounted thereon.
Figure 4B:
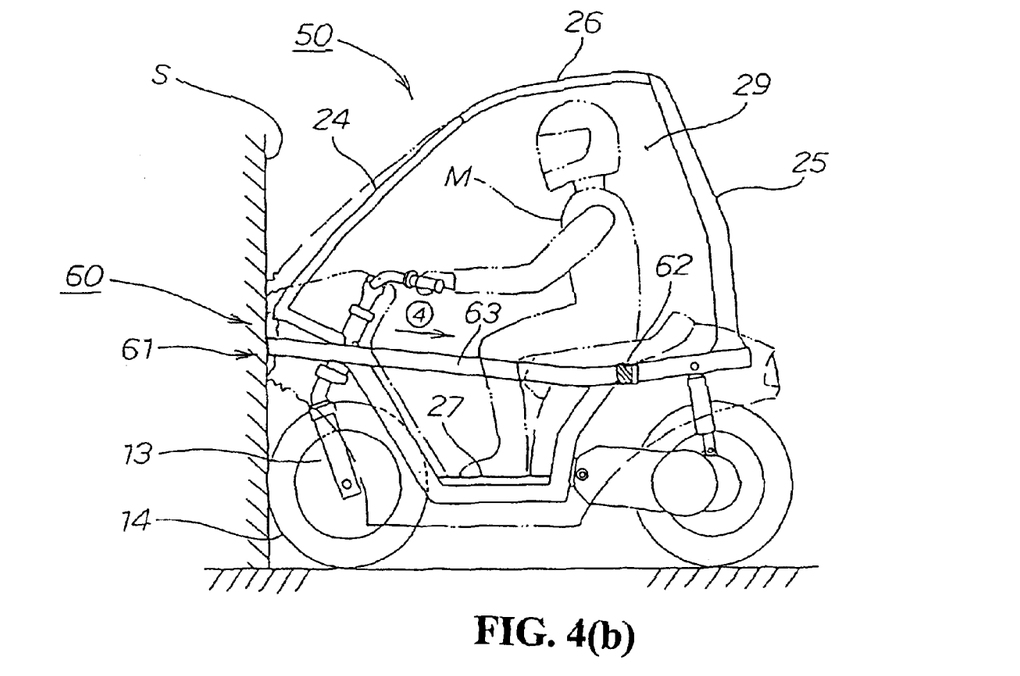

FIGS. 4 (a) and 4(b) are explanatory drawings illustrating the action of the vehicle having a shock absorbing member according to the second embodiment of the present invention mounted thereon.

In FIG. 4(a), for example, the two-wheel vehicle with a cabin 50 is moved in a forward direction as shown by the arrow (3).

In FIG. 4(b), when the two-wheel vehicle with a cabin 50 reaches an obstruction S such as a wall, the front fork 13 and the front wheel 14 is deformed and the bumper member 61 moves as shown by the arrow (4) to have the shock absorbing member 62 crushed. By having the shock absorbing member 62 crushed, the impact load exerted on the two-wheel vehicle with a cabin 60 is absorbed.

As a consequence, deformation of the cabin 29 defined mainly by the floor 27, the roof 26, the supporting members 25, 25, the front members 24, 24 is prevented and thus damage on the cabin 29 as a riding space for the occupant M may be minimized.

Since the two-wheel vehicle with a cabin 50 is mounted in such a manner that the straight portions 63, 63 (one of the numerals 63 is not shown) of the U-shaped bumper member 41 are disposed by the sides of the vehicle body frame 51, it also acts as side members for protecting the cabin 29 from an impact exerted sideways. Therefore, it is referable that the shock absorbing structure 60 is constructed to maintain the cabin 29 against an impact exerted sideways.

Though the shock absorbing structure 40 employing the bumper member 41 and the shock absorbing member 42 in the two-wheel vehicle with a cabin 10 in the embodiment as shown in FIG. 1, the vehicle is not limited to two-wheel vehicle with a cabin, and it may be two-wheel vehicle, three-wheel vehicle, or four-wheel vehicle. In other words, it includes off-road cars such as buggy cars or vehicles for agricultural use.

Though the front member 24 for supporting the roof extends from the head pipe 12 in the embodiment as shown in FIG. 1, it is not limited thereto, and the front member may extend from the vehicle body frame.

Thought the front end 41a of the bumper member 41 is U-shaped in the embodiment as shown in FIG. 1, it is not limited thereto, and may be constructed in such a manner that the shape of the front end is formed into an L-shape or T-shape, and a single shock absorbing member is used at the rear end to absorb the impact.

Though the front end 61a of the bumper member 61 is formed into a U-shape in the second embodiment as shown in FIG. 3, it is not limited thereto, and may be constructed in such a manner that the separate bumper members having an L-shaped or T-shaped front end are arranged, and the shock absorbing members are disposed at the respective rear ends.

The present invention having such a structure described above provides the following advantages.

According to the present invention, in a vehicle having a riding space for an occupant, a bumper member extending substantially long the length of the vehicle for receiving an external force heading from the front toward the occupant is provided under or by the sides of the cabin, and the shock absorbing members are connected at the rear ends of the bumper member. Therefore, even in the case of the vehicle in which it is difficult to dispose the shock absorbing member at the front portion of the vehicle within the range of the length of the vehicle for example, when an impact load is exerted to such a vehicle, the impact load may be efficiently absorbed. As a consequent, the riding space for an occupant can be maintained.

According to the present invention, since the effective crushing length of the shock absorbing member is the length from the front end of the vehicle body to the front end of the riding space, the total amount of movement allowed for maintaining the riding space may be given to the bumper member. As a consequence, when an impact load is exerted on the vehicle, the impact force is efficiently absorbed.

Figure 5:
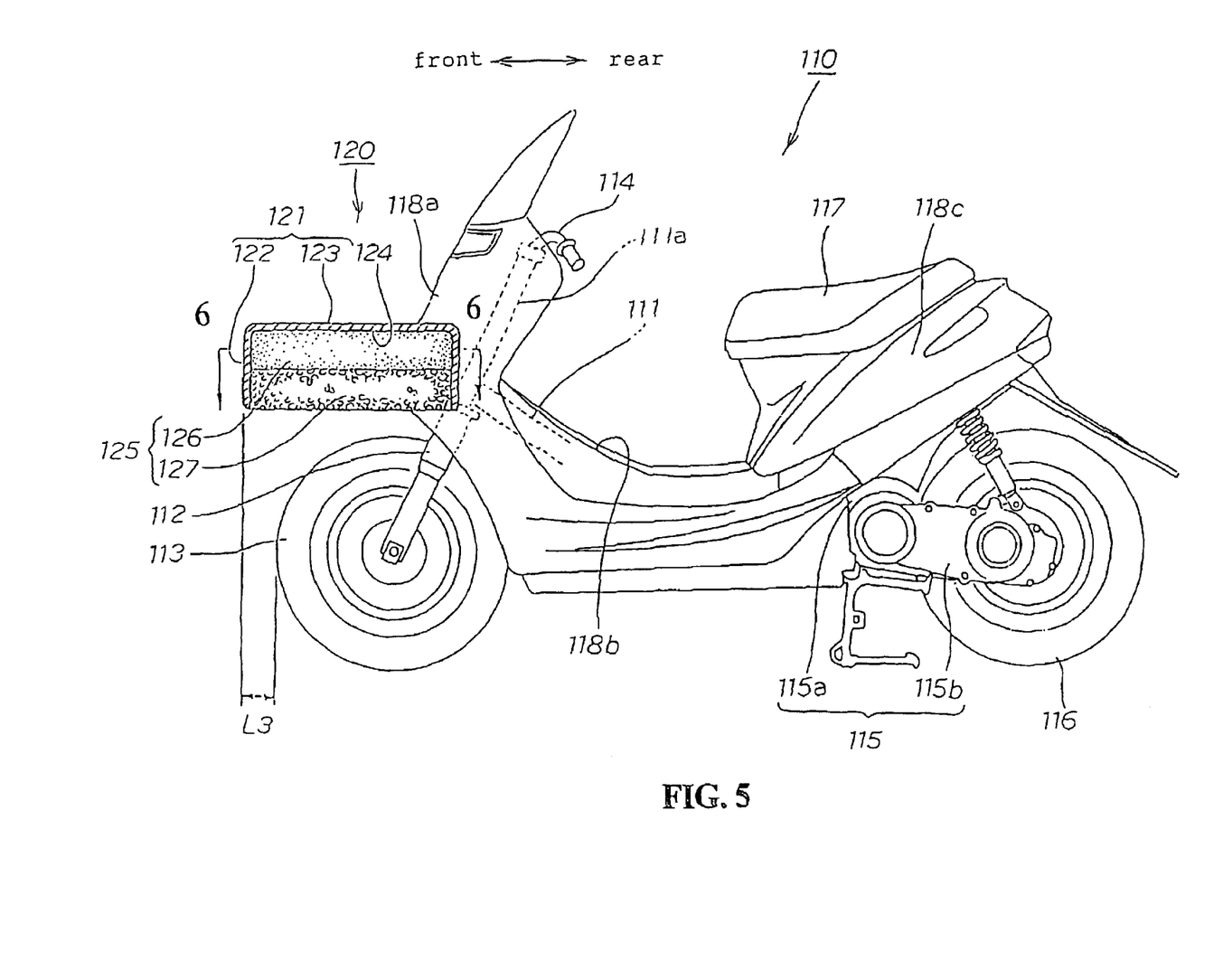
FIG. 5 is a side view of a two-wheel vehicle having a shock absorbing structure according to a third embodiment of the present invention.

Referring now to FIG. 5, a side view of a two-wheel vehicle is illustrated having a shock absorbing structure according to a third embodiment of the present invention. The two-wheel vehicle is described as being a motorcycle, hereinafter.

The motorcycle 110 is a scooter type vehicle mainly comprising a vehicle body frame 111, a front fork 112 attached on a head pipe 111a of the vehicle body frame 111, a front wheel 113 mounted on the front fork 112 and a handle 114 connected to the front fork 112. A swing unit 115 (engine 115a, transmitting mechanism 115b) is mounted on the rear portion of the vehicle body frame 111. A rear wheel 116 is mounted on the rear potion of the swing unit 115. A seat 117 is disposed on the upper rear potion of the vehicle body frame 111. A front cover 118a is provided for covering the front portion of the head pipe 111a. A center cover 118b extends rearwardly from the front cover 118a for covering the center of the vehicle body frame 111, a side cover 118c extending rearward from the center cover 118b for covering the rear portion of the vehicle body frame 111. A shock absorbing structure 120 is mounted on the vehicle body frame 111 or on the head pipe 111a.

The shock absorbing structure 120 comprises a frame body 121 having an angular C-shaped cross section that is mounted on the front cover 118a for example by tightening means (not shown). A shock absorbing body 125 is provided in a space 124 in the frame body 121.

In other words, forming the frame body 121 in an angular C-shape in cross section with a peripheral wall 122 and the top wall 123 of the frame body 121 defines the space 124. The shock absorbing body 125 is disposed in the space 124. Accordingly, in the normal condition, the shock absorbing body 125 can be protected by the frame body 121.

It is also possible to construct the shock absorbing structure 120 only of the shock absorbing body 125 rather than with the frame body 121 having an angular C-shaped cross section.

The shock absorbing body 125 comprises an upper shock absorbing member 126 arranged in the upper portion of the space 124, and a lower shock absorbing member 127 disposed below the upper shock absorbing member 126.

The upper shock absorbing members 126, 127 on the upper and lower sides are formed of foamed resin respectively, and these members 126, 127 are formed of two types of members having different crushing features. Specifically, the upper shock absorbing member 126 is formed of a foamed resin having a higher density in comparison with the lower shock absorbing member 127.

In the shock absorbing structure 125, the front end of the frame body 121 projects forwardly from the front wheel 113 by a length L3.

Figure 6:
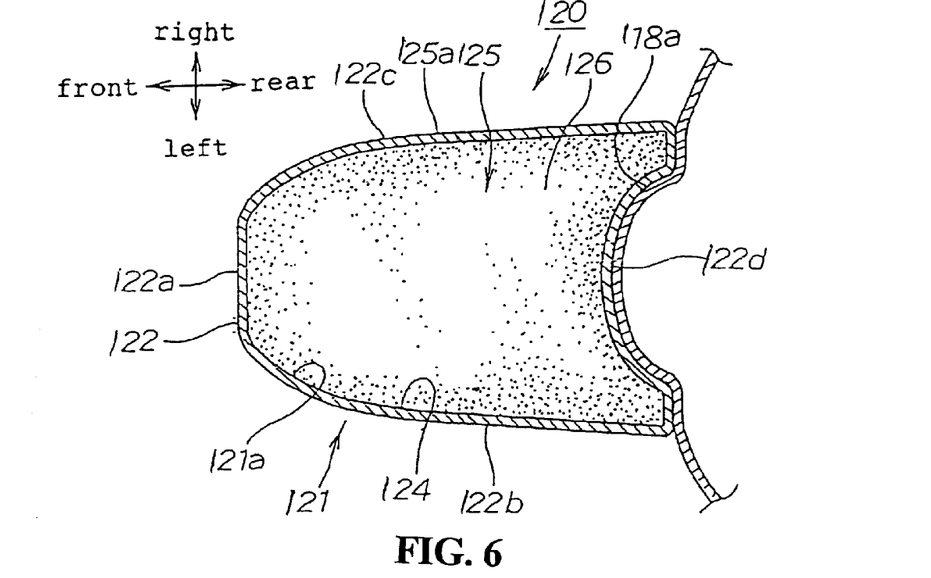
FIG. 6 is a cross sectional view taken along the line 6—6 in FIG. 5.

FIG. 6 is a cross section taken along the line 6—6 in FIG. 5.

The peripheral wall 122 of the frame body 121 comprises a front wall 122a extending in the lateral direction, a left and right walls 122b, 122c extending rearwardly from the left and right ends of the front wall 122a, and a substantially curved rear wall 122d connecting the rear ends of the left and right walls 122b, 122c.

By making the rear wall 122d follow the shape of the front cover 118a, it can be fittingly mounted on the front cover 118a.

The outer periphery 125a of the shock absorbing body 125 comes into contact with the inner periphery 121a of the frame body 121 when being accommodated in the space 124 of the frame body 121.

Figure 7:
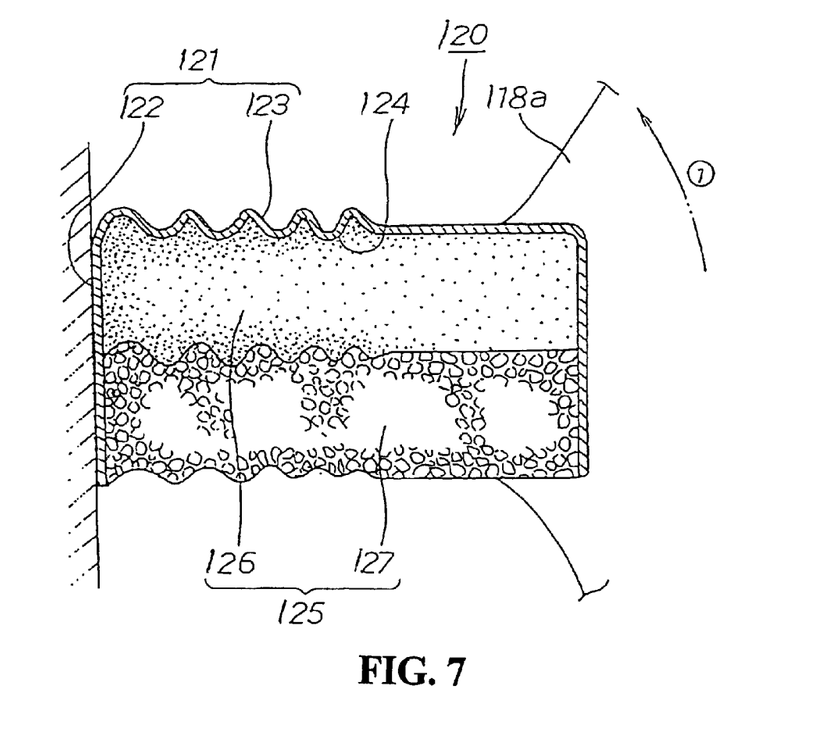
FIG. 7 is a cross sectional view of the shock absorbing structure for two-wheel vehicles according to the present invention (first embodiment)

FIG. 7 is a cross sectional view of the shock absorbing structure of a two-wheel vehicle according to the present invention, showing a state in which the shock absorbing structure is crushed.

The shock absorbing body 125 is constructed of the upper shock absorbing member 126 and the lower shock absorbing member 127. In this way, the shock absorbing member 125 is formed by combining two types of shock absorbing members 126, 127, and the upper and lower shock absorbing members 126, 127 are formed of two types of members having different crushing features.

Since the shock absorbing body 125 is formed by combining two types of members having different crushing features as described above, the crushing extent of the shock absorbing body 125 can desirably be determined to correspond to a specific the two-wheel vehicle.

Therefore, the crushing extent of the shock absorbing body 125 can be determined so as to prevent the occurrence of pitching of the two-wheel vehicle and to significantly reduce the impact force.

In addition, the lower shock absorbing member 127 is formed of a member that is easily deformable by a low-load in comparison with the upper shock absorbing member 126. Therefore, the impact can be absorbed sufficiently by the lower shock absorbing member 127.

Furthermore, forming the upper shock absorbing member 126 of foamed resin having a higher density in comparison with the lower shock absorbing member 127 can make the upper shock absorbing member 127 relatively resistant to being crushed in comparison with the lower shock absorbing member 126. Therefore, the upper shock absorbing member 126 can prevent the shock absorbing body 125 from being crushed too much.

Consequently, an impact can be absorbed sufficiently by the lower shock absorbing member 127 upon collision, and the upper shock absorbing member 126 can prevent the rear portion of the vehicle body of the two-wheel vehicle from bouncing upwardly into the air.

Furthermore, the upper and lower shock absorbing members 126, 127 are formed of foamed resin of the same material so as to provide different crushing features by the difference in density.

By forming the upper and lower shock absorbing members 126, 127 of foamed resin of the same material in different densities, the crushing features of the two members 126, 127 are differentiated. The crushing features of the two members 126, 127 can be differentiated relatively easily because it is achieved only by differentiating the density of the foamed resin.

Foamed resin is a material that is available relatively easily, and the cost thereof is relatively low. As a consequence, the cost of the upper and lower shock absorbing members 126, 127 can be reduced.

In addition, since foamed resin is a material that can be processed relatively easily, it can be processed into a desired shape relatively easily. As a consequent, the shape of the upper and lower shock absorbing members 126, 127 may be selected relatively freely.

The action of the shock absorbing structure 120 according to the present invention described with reference to FIGS. 8(a) and 8(b) which are explanatory drawings illustrating a first action of the shock absorbing structure for two-wheel vehicle according to the third embodiment of the present invention.

Figure 8A:
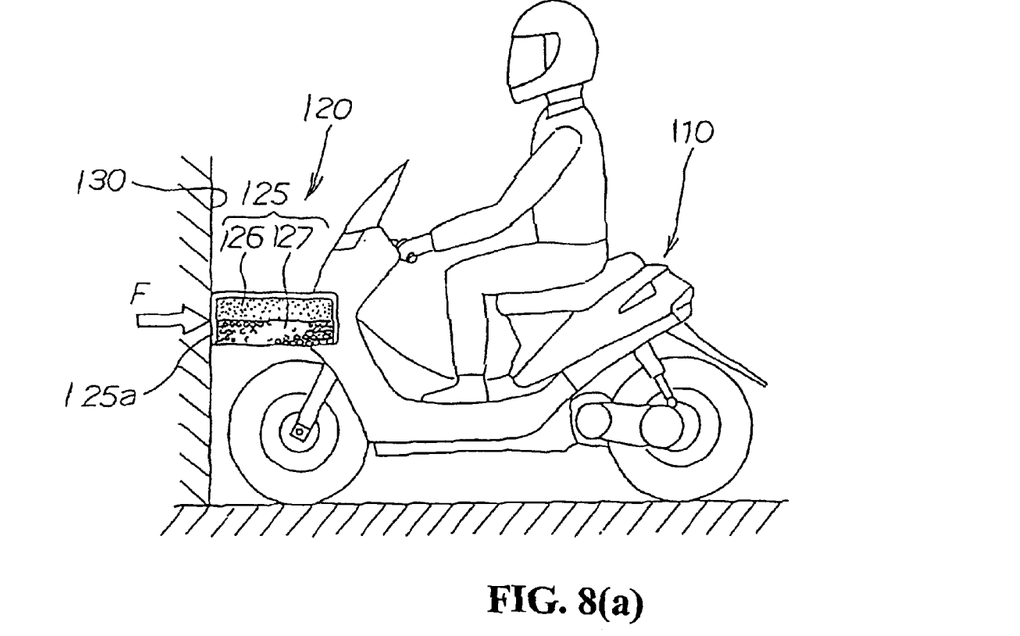
FIGS. 8(a) and 8(b) are explanatory drawings showing the action of the shock absorbing structure for two-wheel vehicles according to the present invention.

In FIG. 8(a), if the front end 125a of the shock absorbing structure 125 comes accidentally into collision with the obstruction 130 during the operation of the motorcycle 110, the impact force F generated due to the collision acts on the shock absorbing structure 125.

Figure 8B:
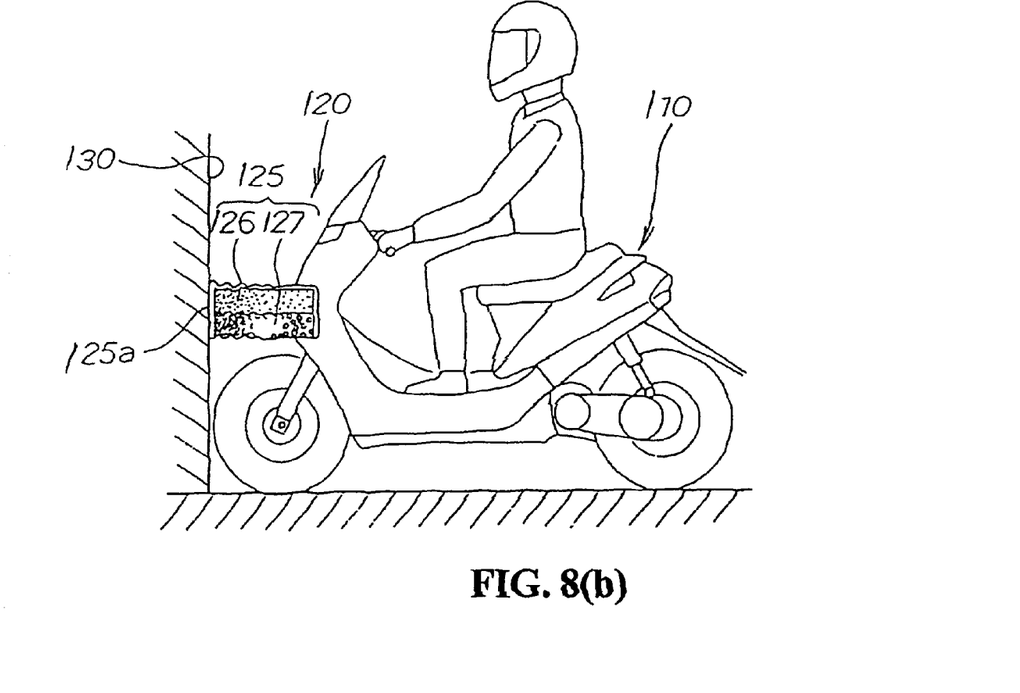

In FIG. 8(b), the shock absorbing structure 125 is crushed and thus absorbs the impact force F. By constructing the shock absorbing body 125 of two types of shock absorbing members 126, 127, the extent of crush of the shock absorbing body 125 can preferably be determined.

Therefore, since the shock absorbing body 125 can be set so as not to be crushed too much, the rear portion of the vehicle body of the motorcycle 110 can be prevented from bouncing upwardly into the air upon collision.

In addition, since the shock absorbing body 125 can be crushed to a moderate degree, the impact force F can be sufficiently absorbed.

Figure 9:
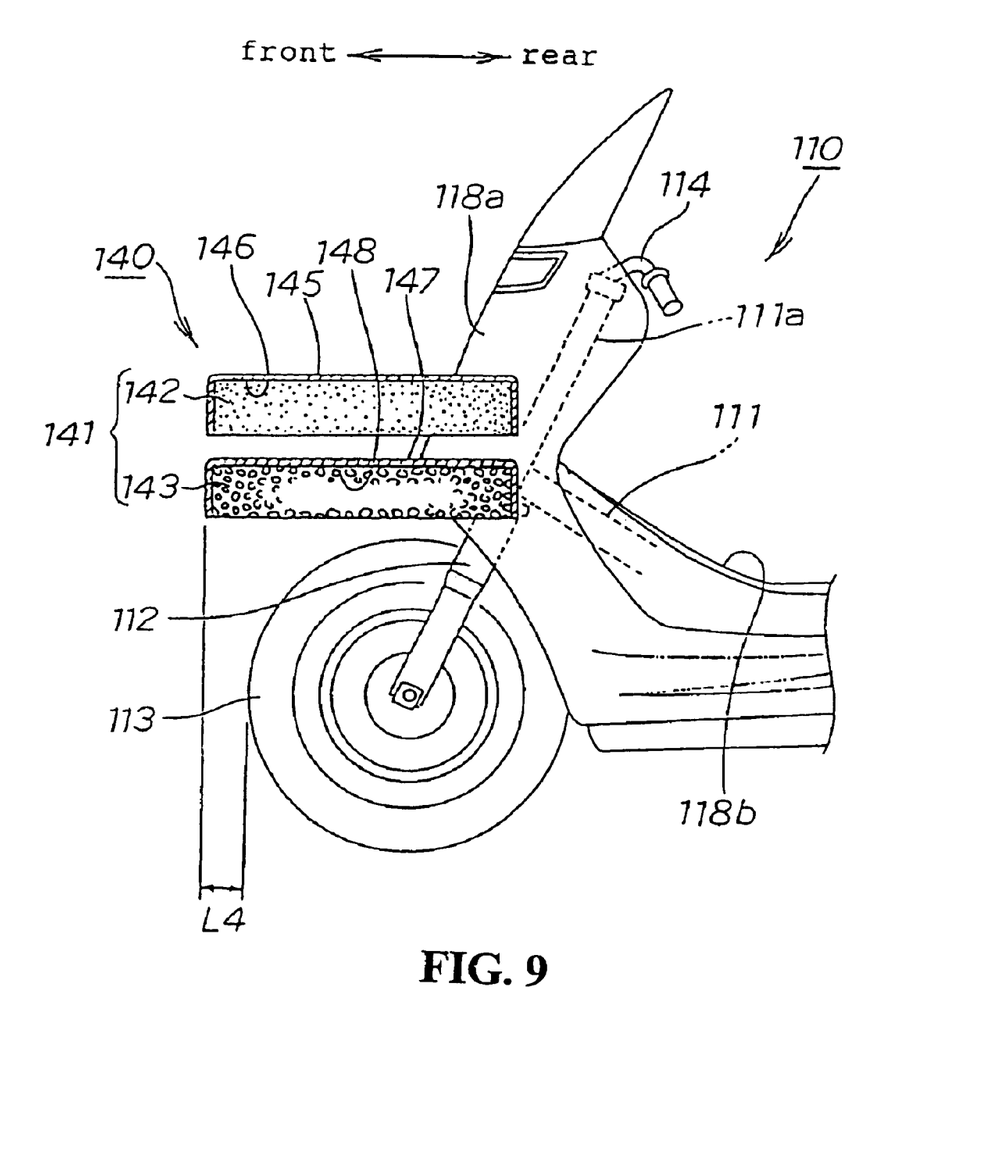
FIG. 9 is a cross sectional view of a shock absorbing structure for two-wheel vehicle according to a fourth embodiment of the present invention.

Referring now to FIG. 9, a fourth embodiment will be described. The same members as those in the first embodiment are represented by the same numerals, and will not be described again.

FIG. 9 is a cross sectional view showing the shock absorbing structure for a two-wheel vehicle according to the present invention.

The shock absorbing structure 140 for the two-wheel vehicle comprises the shock absorbing body 141 constructed of the upper shock absorbing member 142 and the lower shock absorbing member 143, and the upper shock absorbing member 142 and the lower shock absorbing member 143 are disposed independently with a prescribed distance interposed therebetween in the vertical direction.

The upper shock absorbing member 142 is provided in the space 146 of the upper frame body 145, and the lower shock absorbing member 143 is provided in the lower frame body 147 disposed below the upper frame body 145 at a prescribed distance.

The upper and lower frame bodies 145, 147 have the same shape as the frame body 121 of the third embodiment (shown in FIG. 5), and are mounted on the front cover 118a, for example, by tightening means (not shown in FIG. 9), as in the case of the third embodiment.

The front ends of the upper and the lower frame bodies 145, 147 of the shock absorbing structure 140 project forwardly of the front wheel 113 by a length L4.

According to the fourth embodiment, the same effect as in the first embodiment can be obtained.

In addition, the shock absorbing body 141 is constructed in such a manner that the upper shock absorbing member 142 and the lower shock absorbing member 143 are separated and mounted individually on the vehicle body. Since the shock absorbing members 142, 143 on the upper and lower sides may be separated in this way, design freedom may be increased.

In other words, by the construction in which the shock absorbing members 142, 143 on the upper and lower sides are separated, the upper shock absorbing member 142 that is resistant to being crushed may be mounted relatively easily at the position higher than the center of gravity of the vehicle body including the occupant.

Therefore, if the motorcycle accidentally comes into collision with the obstruction 130 (shown in FIG. 8(a)), pitching of the motorcycle may be positively prevented from occurring.

Though an example has been described wherein the shock absorbing structures 120, 140 project from the front wheel 113 in conjunction with the embodiment described above, it is not necessarily required to make the shock absorbing structures 120, 140 project from the front wheel 113.

Though an example in which the shock absorbing member 121 is mounted on the front end of the vehicle body has been described in conjunction with the embodiment described above, the same effect can be obtained when the shock absorbing member 121 is mounted on the rear end of the vehicle body or the left and right side portions as well.

Though an example in which the two-wheel vehicle is a motorcycle 110 has been described in conjunction with the embodiment described above, the two-wheel vehicle is not limited to the motorcycle 110, but may also be applicable to scooters or autocycles.

Though an example in which the upper shock absorbing member 126 is constructed to be more resistant to being crushed in comparison with the lower shock absorbing member 127 has been described, it is not limited thereto, and it is also possible to construct the lower shock absorbing member 127 to be more resistant to being crushed in comparison with the upper shock absorbing member 126.

Though an example in which the front ends of the shock absorbing structures 120, 140 project from the front wheel 113 by a length L1 and a length L2 respectively has been described, it is not limited thereto, and the front ends of the shock absorbing structures 120, 140 do not have to project from the front wheel 113.

In this case, for example, the tire of the front wheel or the vehicle body frame is deformed to absorb the impact force to some extent, and then the shock absorbing structures 120, 140 are crushed to reduce the impact force.

Though a construction in which the shock absorbing structure 120 is accommodated within the frame body 121 having an angular C shaped cross section has been described in conjunction with the first embodiment described above, it is not limited thereto, and the shock absorbing structure 120 may be constructed only of the shock absorbing body 125.

Furthermore, though an example in which the upper and lower shock absorbing members 142, 143 are accommodated in spaces in the upper and lower frame bodies 145, 147 respectively has been described in conjunction with the second embodiment, it is not limited thereto, and the upper and lower shock absorbing members 142, 143 may be constructed so as not to be accommodated within the frame bodies.

Though an example in which the shock absorbing member is formed of foamed resin has been described in conjunction with the embodiment described above, the shock absorbing member may be constructed by employing, for example, a honeycomb construction of aluminum (as an example, the one formed like a beehive) instead of foamed resin, or alternatively, the shock absorbing member may be constructed by forming a resin rib like a lattice structure such as glazing bars on a paper screen, or arranging the stiffening rib into a lattice structure and then reinforcing diagonally on the lattice.

The shock absorbing member of an aluminum honeycomb structure may provide the same effect as the embodiment described above since the crushing feature may be adjusted by changing the configuration of the aluminum honeycomb or by forming notches on a part of the honeycomb by way of example.

On the other hand, the shock absorbing member of a resin rib structure may provide the same effect as the embodiment described above since the crushing feature may be adjusted by changing the arrangement of the resin rib or by forming notches on the resin rib by way of example.

The present invention having constructions described above provide the following advantages. In the present invention, the shock absorbing body is constructed of the upper shock absorbing member and a lower shock absorbing member. The upper and lower shock absorbing members are formed of two types of members having different crushing features. Accordingly, since the shock absorbing body is constructed by combining two members having different crushing features, the crushing extent of the shock absorbing body may preferably be determined corresponding to the two-wheel vehicle.

Therefore, the crushing extent of the shock absorbing body may be set so that pitching of the two-wheel vehicle may be prevented from occurring, and the impact load may be reduced sufficiently.

In the present invention, the impact may be absorbed sufficiently by employing a member that is easily deformable by a low-load as the lower shock absorbing member. In addition, the upper shock absorbing member may prevent the shock absorbing body from being crushed too much. Therefore, the impact is sufficiently absorbed and the rear portion of the vehicle body of the two-wheel vehicle may be prevented from bouncing upwardly into the air upon collision.

In the present invention, the crushing features of the two members are differentiated by constructing these two members of foamed resin of the same material but different in density. The crushing features of the two members can be differentiated relatively easily because it is achieved only by making the density of the foamed resin different. Therefore, the cost of the upper and the lower shock absorbing members can be reduced.

In addition, foamed resin is a material that is available relatively easily, and the cost thereof is relatively low. Therefore, the cost of the upper and lower shock absorbing members can be reduced.

Furthermore, since foamed resin is a material that can be processed relatively easily, it can be formed into a desired shape relatively easily. Therefore, the configuration of the upper and lower shock absorbing members can be selected relatively easily.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a vehicle having a riding space for an occupant, a shock absorbing structure for vehicles comprising:

a bumper member extending substantially along a length of the vehicle for receiving an external force heading from a front side of the vehicle to the occupant; and a pair of shock absorbing members having front ends connected at rear ends of the bumper member, the pair of shock absorbing members having rear ends fitted into a pair of receiving portions of a vehicle body frame, the receiving portions being located rearwardly of a rear end of a floor of the vehicle, wherein the external force on the bumper member is received by the pair of shock absorbing members fitted into the receiving portions located rearwardly of the rear end of the floor.

2. The shock absorbing structure for a vehicle according to claim 1, wherein a crushing amount of the pair of shock absorbing members is referred to as an effective crushing length of the pair of shock absorbing members, the effective crushing length being the length from the front end of the vehicle body to a front end of the riding space.

3. The shock absorbing structure for a vehicle according to claim 1, wherein the bumper member is a U-shaped member that includes a front portion for engaging an obstruction and rearwardly extending portions that project rearwardly from the front portion of the bumper member, said rearwardly extending portions being disposed adjacent to the pair of shock absorbing members for absorbing a shock during an accident.

4. The shock absorbing structure for a vehicle according to claim 3, wherein the shocking absorbing members are of a predetermined length that corresponds to a distance between the front portion of the bumper member to a front portion of the vehicle riding space.

5. In a vehicle having a riding space for an occupant, a shock absorbing structure for vehicles comprising:

a bumper member extending from a front of the vehicle and substantially along sides of the riding space for receiving an external force heading from the front to the occupant and for absorbing a side force; and a pair of shock absorbing members connected at rear ends of the bumper member, the pair of shock absorbing members being disposed in receiving portions of a vehicle body frame located rearwardly of a rear end of the floor and adjacent to right and left sides of a seat of the vehicle, wherein the external force on the bumper member is received by the pair of shock absorbing members fitted into the receiving portions located rearwardly of the rear end of the floor.

6. The shock absorbing structure for a vehicle according to claim 5, wherein a crushing amount of the shock absorbing members is referred to as an effective crushing length of the shock absorbing members, the effective crushing length being the length from a front end of the vehicle body to a front end of the riding space.

7. The shock absorbing structure for a vehicle according to claim 5, wherein the bumper member is a U-shaped member that includes a front portion for engaging an obstruction and rearwardly extending portions that project rearwardly from the front portion of the bumper member, said rearwardly extending portions being disposed adjacent to the pair of shock absorbing members for absorbing a shock during an accident.

8. The shock absorbing structure for a vehicle according to claim 7, wherein the shocking absorbing members are of a predetermined length that corresponds to a distance between the front portion of the bumper member to a front portion of the vehicle riding space.

9. A shock absorbing structure for a vehicle for absorbing an impact by having a shock absorbing body projecting from a vehicle body crushed during impact, the shock absorbing body comprising:

an upper shock absorbing member disposed on an upper side; and a lower shock absorbing member disposed below the upper shock absorbing member, wherein the upper and the lower shock absorbing members are formed of two types of members having different crushing features, and wherein the upper and the lower shock absorbing members have rear sides mounted on the vehicle body at a position that is rearward of a center of the front wheel, and have front sides which project forwardly of the front wheel by a predetermined length.

10. The shock absorbing structure for a vehicle according to claim 9, wherein the lower shock absorbing member is easily deformable by a low-load in comparison with the upper shock absorbing member.

11. The shock absorbing structure for a vehicle according to claim 9, wherein the upper and the lower shock absorbing members are constructed of foamed resin made of the same material but having different crushing features due to a difference in density, the foamed resin material filling spaces within the upper and the lower shock absorbing members from the front sides to the rear sides thereof.

12. The shock absorbing structure for a vehicle according to claim 9, wherein said shocking absorbing body has an angular C-shape.

13. The shock absorbing structure for a vehicle according to claim 9, wherein said upper shock absorbing member is spaced at a predetermined distance relative to said lower shock absorbing member.

14. The shock absorbing structure for a vehicle according to claim 1, wherein the bumper member is formed with a bent stepwise shape with three straight sections when viewed in a side view.

15. The shock absorbing structure for a vehicle according to claim 5, wherein the bumper member has a substantially straight view when viewed in a side view.

16. The shock absorbing structure for a vehicle according to claim 9, wherein a rear wall of the shock absorbing body is curved in order to be fittingly mounted on a front cover of the vehicle.

* * * * *